(12) United States Patent
Bleile et al.

(10) Patent No.: US 8,788,235 B2
(45) Date of Patent: Jul. 22, 2014

(54) METHOD FOR DIAGNOSING AN ACTUATOR FOR A BOOST PRESSURE SYSTEM OF AN INTERNAL COMBUSTION ENGINE

(75) Inventors: Thomas Bleile, Stuttgart (DE); Thomas Oertel, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 404 days.

(21) Appl. No.: 12/789,941

(22) Filed: May 28, 2010

(65) Prior Publication Data

US 2010/0324857 A1  Dec. 23, 2010

(30) Foreign Application Priority Data

Jun. 18, 2009  (DE) .......................... 10 2009 027 010

(51) Int. Cl.
*G01M 15/04* (2006.01)
*G01M 15/10* (2006.01)
*F02B 33/00* (2006.01)

(52) U.S. Cl.
USPC ........ 702/113; 702/33; 123/564; 123/568.21; 123/690; 73/114.37; 73/114.74

(58) Field of Classification Search
USPC ................ 702/33, 113; 123/564, 568.1, 690; 73/114.37, 114.74
See application file for complete search history.

(56) References Cited

U.S. PATENT DOCUMENTS 5,445,019 A * 8/1995 Glidewell et al. .......... 73/114.51
2009/0114003 A1* 5/2009 Wegener et al. ........... 73/114.79

* cited by examiner

*Primary Examiner* — Sujoy Kundu
*Assistant Examiner* — L. Anderson
(74) *Attorney, Agent, or Firm* — Kenyon & Kenyon LLP

(57) ABSTRACT

A method for diagnosing an actuator for a boost pressure system of an internal combustion engine, in which the actuator is controlled using a triggering signal, and a state variable of the boost pressure system which is at least an indirect function of the triggering signal is detected. The triggering signal is periodic, and a curve of the values of the state variable is analyzed with regard to at least one periodic characteristic.

27 Claims, 2 Drawing Sheets

METHOD FOR DIAGNOSING AN ACTUATOR FOR A BOOST PRESSURE SYSTEM OF AN INTERNAL COMBUSTION ENGINE

FIELD OF THE INVENTION

The present invention relates to a method for diagnosing an actuator for a boost pressure system of an internal combustion engine, in which the actuator is controlled using a triggering signal, and a state variable of the boost pressure system which is at least an indirect function of the triggering signal is detected.

The present invention further relates to a computer program and to a control unit for an internal combustion engine.

BACKGROUND INFORMATION

The boost pressure, i.e., the pressure at which combustion air is supplied to an internal combustion engine, has an important influence on the emissions from the internal combustion engine. It is therefore necessary to be able to recognize errors in the boost pressure system, in particular the actuators for the boost pressure system. This includes not only recognition of a complete failure or defect of an actuator, but also recognition of age-related deterioration.

It is known from prior use to monitor allowable system deviations in steady-state operation of the internal combustion engine. However, this type of monitoring does not allow recognition of errors which occur in a non-steady state of the boost pressure system or of the internal combustion engine.

SUMMARY OF THE INVENTION

Accordingly, an object of the present invention is to improve a method of the aforementioned type in such a way that the method is suitable for recognizing errors which occur in a non-steady state of the boost pressure system or of the internal combustion engine.

For a method of the aforementioned type, this object is achieved according to the present invention by the fact that the triggering signal is periodic, and a curve of the values of the state variable is analyzed with regard to at least one periodic characteristic.

The method according to the present invention allows recognition of whether a rate at which an actuator responds to a triggering signal is sufficiently high. For this purpose, a curve of the values of the state variable is analyzed with regard to at least one periodic characteristic. This allows a decision to be made as to whether there is an adequate temporal relationship between an adjustment of the state variable and the periodic triggering signal of the actuator to be diagnosed.

The at least one periodic characteristic advantageously includes an amplitude and/or phase shift of the curve of the values. These characteristics of the curve of the values may be ascertained with the aid of a Fourier analysis.

The at least one periodic characteristic is preferably compared to a specifiable or specified limit value. The limit value is preferably ascertained with the aid of a defect-free boost pressure system, so that performance indicators may be stored which may then be compared to the at least one periodic characteristic of the curve of the values of the state variable. For example, a value which is less than a limit value may be considered to be equivalent to a diagnosis of a defective actuator. The actuator may be replaced or repaired, thus avoiding a negative effect on emissions from the internal combustion engine.

The method is advantageously initiated when the internal combustion engine is in a steady state. From there, the method is preferably carried out in overrun or idle mode of the internal combustion engine. This allows use of a triggering signal which on average is at least essentially constant and whose value periodically fluctuates about a mean value.

The method according to the present invention may be used for any actuator for a boost pressure system of an internal combustion engine. However, it is particularly advantageous when the actuator is a throttle valve for controlling a fresh air flow which may be supplied to the internal combustion engine, a valve for controlling an exhaust gas recirculation flow which may be supplied to the internal combustion engine, a valve for controlling an exhaust gas flow which may be supplied to an exhaust gas turbocharger, or an actuator for controlling the turbine geometry of an exhaust gas turbocharger. These actuators have a particularly great influence on the boost pressure, and thus on the emissions, of the internal combustion engine.

The active periodic control of the actuator results in a corresponding periodic change in at least one state variable of the boost pressure system. In particular, this state variable concerns the mass or volume flow and/or the pressure of a fresh air flow supplied to the internal combustion engine, of an exhaust gas recirculation flow supplied to the internal combustion engine, of an exhaust gas flow discharged from the internal combustion engine, and/or of an exhaust gas flow supplied to an exhaust gas turbocharger. These state variables may be ascertained with the aid of suitable sensors, in particular air mass flowmeters and/or pressure sensors.

Of particular importance is the implementation of the method according to the present invention in the form of a computer program which may be stored on an electronic storage medium, and which in this form may be assigned to a control unit which controls the internal combustion engine.

DETAILED DESCRIPTION

Figure 1:
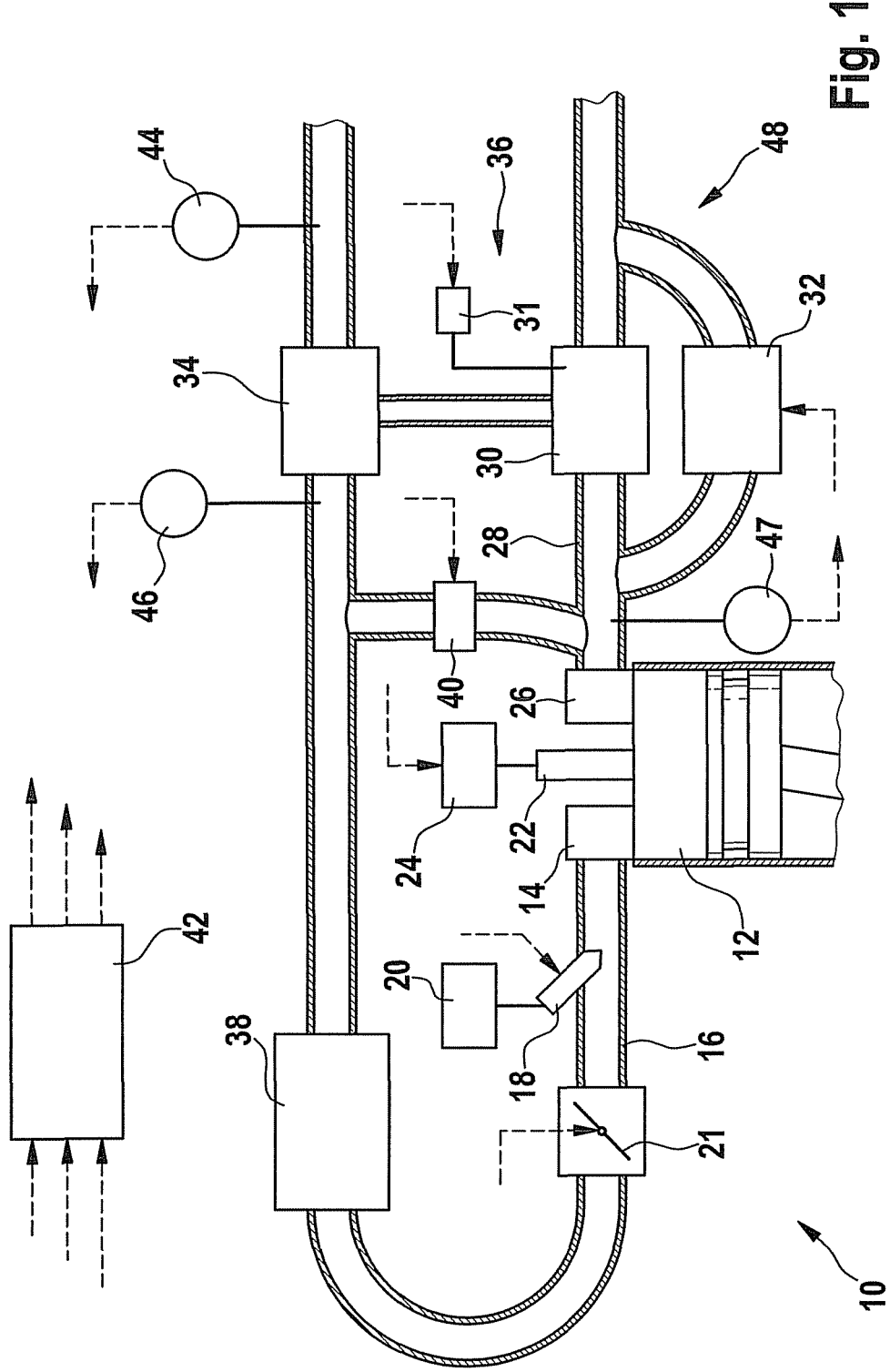
FIG. 1 shows a schematic illustration of an internal combustion engine and a boost pressure system.

An internal combustion engine is collectively denoted by reference numeral 10 in FIG. 1. The internal combustion engine is used to drive a motor vehicle, not illustrated. Internal combustion engine 10 is designed as a diesel internal combustion engine, although in principle the following description likewise applies to spark ignition internal combustion engines.

Internal combustion engine 10 includes multiple cylinders, each having a combustion chamber 12. Combustion air passes into the combustion chamber via an intake duct 14. In intake duct 14 fresh air is conducted through a filter 16 and an air mass sensor 18 ("HFM"), and passes into a compressor 20. Compressor 20 has a plurality of compressor vanes or compressor blades, schematically indicated in FIG. 1, for compressing the air.

The intake air which is heated by the compression is cooled by an intercooler 22. The intercooler is situated between compressor 20 and a throttle valve 24.

Hot combustion exhaust gas is discharged from combustion-chamber 12 through an exhaust duct 26. A turbine 28 is situated in the exhaust duct. The position of the turbine blades of turbine 28 may be adjusted with the aid of an actuator 30, so that the turbine geometry of turbine 28 may be modified.

Turbine 28 and compressor 20 are mechanically connected to one another, and together form an exhaust gas turbocharger 32.

An exhaust gas recirculation system 34 is provided for recirculating exhaust gas from exhaust duct 26 to the fresh air side. The exhaust gas recirculation system includes an exhaust gas recirculation valve 36 for regulating an exhaust gas recirculation flow.

A cooling device 38 is provided for cooling the exhaust gas recirculation flow. The exhaust gas recirculation flow may also be conducted through a bypass 40 with the aid of a control valve 42.

The exhaust gas is purified with the aid of an oxidation catalyst 44 and a two-stage particle filter 46. A muffler 47 is also provided.

The operation of internal combustion engine 10 is controlled and regulated by a control unit, not illustrated in the drawing. Throttle valve 24, actuator 30, and exhaust gas recirculation valve 36 in particular are triggered by the control unit.

Throttle valve 24, actuator 30, and exhaust gas recirculation valve 36 are actuators for a boost pressure system 48 for controlling a boost pressure, via which combustion air is supplied to combustion chamber 12 of internal combustion engine 10.

Figure 2:
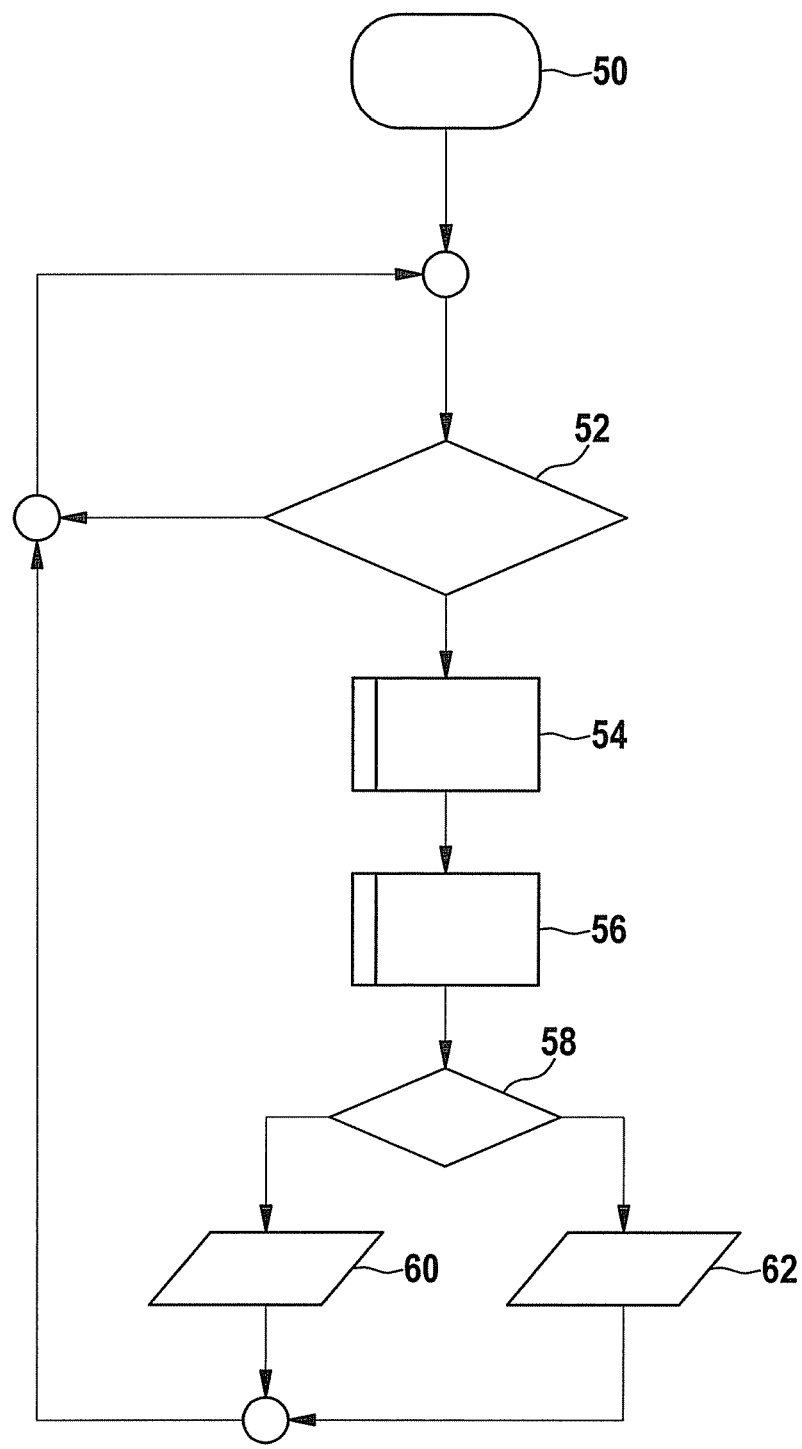
FIG. 2 shows one specific embodiment in a flow diagram for diagnosing an actuator for the boost pressure system.

The control unit is configured in such a way that a method, schematically illustrated in FIG. 2, may be carried out. Starting at an initial state 50 of internal combustion engine 10 and of boost pressure system 48, in one phase 52 monitoring is performed to determine whether operating states are achieved which are suitable for carrying out a diagnosis, i.e., are relevant for monitoring. These operating states in particular are steady operating states of internal combustion engine 10 and of boost pressure system 48.

Phase 52 is run through as many times as necessary until an operating state relevant for monitoring is achieved. For this case, during a specifiable time period in a phase 54 one of the above-referenced actuators is controlled using a periodic triggering signal. During this time period a state variable of boost pressure system 48 is detected, and the periodic curve of the values of this state variable is evaluated with regard to the height of an amplitude and/or the length of a phase shift, with the aid of a Fourier analysis in step 56. In a phase 58 this allows a comparison to characteristic values stored in the control unit, so that based on this comparison, in a step 60 an error message is output or in a step 62 no error message is output.

The actuator to be diagnosed in particular is actuator 30, and the state variable to be detected is the air mass flow, which is detected with the aid of air mass sensor 18. Alternatively, a signal may be used which characterizes the exhaust gas recirculation rate. The exhaust gas recirculation rate is the ratio of the recirculated exhaust gas flow to the total mass flow in internal combustion engine 10. A signal of a pressure sensor may also be evaluated for detecting a boost pressure.

The amplitude of the change in the air mass signal of air mass sensor 18 may be evaluated with the aid of a Fourier analysis. The frequency of the period in which actuator 30 is triggered causes a response at the same frequency in the air system, so that the air mass flow measured with the aid of air mass sensor 18 periodically changes at the same frequency. In this case, therefore, it is sufficient to ascertain the amplitude of the fluctuations in the air mass flow and to compare same to a limit value. This allows a conclusion to be drawn concerning the rate at which actuator 30 implements the periodic triggering signals. If this rate is too low, a defect in actuator 30 may be deduced.

What is claimed is:

1. A method for diagnosing an actuator for a boost pressure system of an internal combustion engine, comprising:
    controlling, by a control unit, the actuator using a triggering signal, the triggering signal being periodic at a selected frequency;
    detecting, by a sensor, a state variable of the boost pressure system which is at least an indirect function of the triggering signal, the state variable being periodic at the selected frequency; and
    analyzing, by the control unit, a curve of values of the state variable with regard to at least one periodic characteristic to determine whether a rate of response of the actuator to the triggering signal has at least a predetermined threshold value.

2. The method according to claim 1, wherein the at least one periodic characteristic includes at least one of an amplitude and a phase shift of the curve of the values.

3. The method according to claim 1, further comprising:
    after the analyzing step, comparing the at least one periodic characteristic to a predetermined limit value.

4. The method according to claim 1, wherein the method is initiated when the internal combustion engine is in a steady state.

5. The method according to claim 1, wherein the method is carried out in an overrun or idle mode of the internal combustion engine.

6. The method according to claim 1, wherein the actuator is a throttle valve for controlling a fresh air flow supplied to the internal combustion engine, a valve for controlling an exhaust gas recirculation flow supplied to the internal combustion engine, a valve for controlling an exhaust gas flow supplied to an exhaust gas turbocharger, or an actuator for controlling a turbine geometry of an exhaust gas turbocharger.

7. The method according to claim 1, wherein the state variable of the boost pressure system represents a mass or volume flow of a fresh air flow supplied to the internal combustion engine, of an exhaust gas recirculation flow supplied to the internal combustion engine, of an exhaust gas flow discharged from the internal combustion engine, or of an exhaust gas flow supplied to an exhaust gas turbocharger.

8. The method according to claim 1, wherein the state variable of the boost pressure system represents a pressure of a fresh air flow supplied to the internal combustion engine, of an exhaust gas recirculation flow supplied to the internal combustion engine, of an exhaust gas flow discharged from the internal combustion engine, or of an exhaust gas flow supplied to an exhaust gas turbocharger.

9. The method according to claim 2, wherein the amplitude and the phase shift of the curve of the values are ascertained by a Fourier analysis.

10. The method according to claim 1, further comprising:
    monitoring the internal combustion engine to determine whether the internal combustion engine is in an overrun mode or an idle mode, wherein the controlling, detecting, and analyzing are part of a diagnosis process that is carried out responsive to determining in the monitoring step that the internal combustion engine is in the overrun mode or the idle mode.

11. The method according to claim 1, further comprising:
    determining, based on the analysis, whether there is a threshold degree of temporal correspondence between a change in the state variable and the periodicity of the triggering signal.

12. A non-transitory computer-readable medium containing a computer program which when executed by a processor performs the following method for diagnosing an actuator for a boost pressure system of an internal combustion engine:
    controlling the actuator using a triggering signal, the triggering signal being periodic at a selected frequency;
    detecting a state variable of the boost pressure system which is at least an indirect function of the triggering signal, the state variable being periodic at the selected frequency; and
    analyzing a curve of values of the state variable with regard to at least one periodic characteristic to determine whether a rate of response of the actuator to the triggering signal has at least a predetermined threshold value.

13. The non-transitory computer-readable medium according to claim 12, wherein the at least one periodic characteristic is compared to a predetermined limit value.

14. The non-transitory computer-readable medium according to claim 12, wherein the internal combustion engine is in a steady state during the monitoring of the internal combustion engine.

15. The non-transitory computer-readable medium according to claim 12, wherein the actuator is one of:
    a throttle valve for controlling a fresh air flow supplied to the internal combustion engine;
    a valve for controlling an exhaust gas recirculation flow supplied to the internal combustion engine;
    a valve for controlling an exhaust gas flow supplied to an exhaust gas turbocharger; and
    an actuator for controlling a turbine geometry of an exhaust gas turbocharger.

16. The non-transitory computer-readable medium according to claim 12, wherein the state variable of the boost pressure system represents a mass or volume flow of at least one of: (a) a fresh air flow supplied to the internal combustion engine, (b) an exhaust gas recirculation flow supplied to the internal combustion engine, (c) an exhaust gas flow discharged from the internal combustion engine, or (d) of an exhaust gas flow supplied to an exhaust gas turbocharger.

17. The non-transitory computer-readable medium according to claim 12, wherein the state variable of the boost pressure system represents a pressure of at least one of: (a) a fresh air flow supplied to the internal combustion engine, (b) an exhaust gas recirculation flow supplied to the internal combustion engine, (c) an exhaust gas flow discharged from the internal combustion engine, or (d) an exhaust gas flow supplied to an exhaust gas turbocharger.

18. The non-transitory computer-readable medium according to claim 12, wherein the at least one periodic characteristic includes at least one of an amplitude and a phase shift of the curve of the values.

19. The non-transitory computer-readable medium according to claim 18, wherein the amplitude and the phase shift of the curve of the values are ascertained by a Fourier analysis.

20. A control unit for diagnosing an actuator for a boost pressure system of an internal combustion engine, comprising:
    an arrangement for controlling the actuator using a triggering signal, the triggering signal being periodic at a selected frequency;
    an arrangement for detecting a state variable of the boost pressure system which is at least an indirect function of the triggering signal, the state variable being periodic at the selected frequency; and
    an arrangement for analyzing a curve of values of the state variable with regard to at least one periodic characteristic to determine whether a rate of response of the actuator to the triggering signal has at least a predetermined threshold a sufficiently high value.

21. The control unit according to claim 20, wherein, the at least one periodic characteristic is compared to a predetermined limit value.

22. The control unit according to claim 20, wherein the internal combustion engine is in a steady state during monitoring of the internal combustion engine.

23. The control unit according to claim 20, wherein the actuator is one of:
    a throttle valve for controlling a fresh air flow supplied to the internal combustion engine;
    a valve for controlling an exhaust gas recirculation flow supplied to the internal combustion engine;
    a valve for controlling an exhaust gas flow supplied to an exhaust gas turbocharger; and
    an actuator for controlling a turbine geometry of an exhaust gas turbocharger.

24. The control unit according to claim 20, wherein the state variable of the boost pressure system represents a mass or volume flow of at least one of: (a) a fresh air flow supplied to the internal combustion engine, (b) an exhaust gas recirculation flow supplied to the internal combustion engine, (c) an exhaust gas flow discharged from the internal combustion engine, or (d) of an exhaust gas flow supplied to an exhaust gas turbocharger.

25. The control unit according to claim 20, wherein the state variable of the boost pressure system represents a pressure of at least one of: (a) a fresh air flow supplied to the internal combustion engine, (b) an exhaust gas recirculation flow supplied to the internal combustion engine, (c) an exhaust gas flow discharged from the internal combustion engine, or (d) an exhaust gas flow supplied to an exhaust gas turbocharger.

26. The control unit according to claim 20, wherein the at least one periodic characteristic includes at least one of an amplitude and a phase shift of the curve of the values.

27. The control unit according to claim 26, wherein the amplitude and the phase shift of the curve of the values are ascertained by a Fourier analysis.

\* \* \* \* \*